(12) United States Patent
Savard (10) Patent No.: US 6,679,129 B2
(45) Date of Patent: Jan. 20, 2004

(54) PIG FOR DETECTING AN OBSTRUCTION IN A PIPELINE

(75) Inventor: Donald D. Savard, Edmonton (CA)

(73) Assignee: Donsa, Inc., Edmonton (CA)

( * ) Notice: Subject to any disclaimer, the term of this patent is extended or adjusted under 35 U.S.C. 154(b) by 0 days.

(21) Appl. No.: 10/269,520

(22) Filed: Oct. 11, 2002

(65) Prior Publication Data

US 2003/0029256 A1 Feb. 13, 2003

Related U.S. Application Data

(63) Continuation-in-part of application No. 09/899,906, filed on Jul. 6, 2001, which is a continuation-in-part of application No. 09/250,504, filed on Feb. 16, 1999, now abandoned.

(30) Foreign Application Priority Data

Feb. 18, 1998 (CA) .............................................. 2229771

(51) Int. Cl.⁷ ................................................. G01B 7/12
(52) U.S. Cl. .................................................... 73/865.8
(58) Field of Search .......................... 73/865.8; 33/542, 33/544, 544.2

(56) References Cited

U.S. PATENT DOCUMENTS

| | | | |
|---|---|---|---|
| 3,755,908 A | 9/1973 | VerNooy | 33/178 F |
| 4,091,678 A | 5/1978 | Potter | 73/432 R |
| 4,098,126 A | 7/1978 | Howard | 73/432 R |
| 4,227,309 A | 10/1980 | Jones | 33/544 |
| 4,299,033 A | 11/1981 | Kinley et al. | 33/178 F |
| 4,443,948 A | 4/1984 | Reeves | 33/178 R |
| 4,457,073 A | 7/1984 | Payne | 33/178 F |
| 4,481,816 A | 11/1984 | Prentice | 73/432 R |
| 4,953,412 A | 9/1990 | Rosenberg et al. | 73/865.8 |
| 5,088,336 A | 2/1992 | Rosenberg et al. | 73/865.8 |

FOREIGN PATENT DOCUMENTS

SU         1421853   *  9/1988   ................ 73/865.8

* cited by examiner

*Primary Examiner*—Robert Raevis
(74) *Attorney, Agent, or Firm*—Hovey Williams LLP (57) ABSTRACT

An obstacle detecting pig for preliminary inspection of a section of a pipeline travels through the section and determines if there are any restrictions that exceed industry guidelines or that might damage other pigs that require the full bore of the pipe. In a first embodiment, a disk-shaped segmented resilient member (14) is mounted in the body of the pig. Its outside diameter is smaller by a spacing (21) than the inside diameter of the pipeline (15). The spacing is set at the maximum tolerable size of the obstacle encountered. The deformation of the member (14) is transmitted by a linkage (22) to a slider (16) activating a switch system signaling that an obstacle has been encountered. A non-resiliently deformable checkup disk (19) may be provided at the rear end of the pig, to double check that a no-signal passage through the pipe is not due to failure of the switching system. In a particularly preferred embodiment, the resilient member is a disc-shaped detector (46) made from an elastomer and provided at its leading surface with a scratch recording layer (51), for instance a layer of lead which is thin enough to follow resilient deformations of the elastomeric ring (50) as it encounters an obstacle, and return of the ring back to its regular, shape. The scratches caused on the recording layer are evaluated after the passage of the pig through the examined pipeline section. The detector is mounted directly on a slider (44) or the like operating device designed to produce electric signal when an anomaly is encountered. Preferably, the detector (46) is a replaceable element of the pig. In another embodiment described and claimed, the detector is comprised of a pair of flexible discs having embedded therein pairs of electronic signal providing means such as a magnet and a magnetic switch or sensor.

The device is structurally simple thus providing low manufacturing and operation costs and simple operation.

12 Claims, 8 Drawing Sheets

PIG FOR DETECTING AN OBSTRUCTION IN A PIPELINE

RELATED APPLICATION

This is a continuation-in-part of application Ser. No. 09/899,906 filed Jul. 6, 2001, which is a continuation-in-part of Ser. No. 09/250,504 filed Feb. 16, 1999 now abandoned.

BACKGROUND OF THE INVENTION

The present invention relates to obstacle monitoring pipeline pigs used in checking the interior of a pipeline for obstacles which might impede the movement of subsequently used pipeline inspecting devices or which exceed industry guidelines.

A number of caliper pigs are on the market that provide detection of anomalies inside pipelines. They are usually expensive to produce and operate. These existing pigs monitor all restrictions along a pipeline regardless of the size of the anomalies. They normally collect a significant amount of data that requires interpretation by a technician or computer programs. This type of caliper pigs is represented, for instance, by the disclosure of U.S. Pat. Nos. 4,953,412 and 5,088,336 (both Rosenberg et al.) and also by U.S. Pat. No. 3,755,908 (VerNooy). The disclosures of the above patents are incorporated herein by reference.

U.S. Pat. No. 4,481,816 (Prentice) describes a caliper pig provided with a monitoring arrangement comprising a substantially circular array of detecting, portions which deform upon contact with the interior surface of the pipeline and remain deformed to provide an indication that the minimum radial distance has been exceeded. Viewed from the standpoint of the present invention, the device disclosed is of a relatively complex structure and allows only a single use of the detecting portions. Also, if a relatively large deformity is encountered prior to reaching a somewhat smaller deformity, the latter may be undetected.

U.S. Pat. No. 4,227,309 (Jones) describes a pipeline pig which includes a flexible disc at a foremost part of the body. The disc is fixedly secured to the body of the pig and is provided with strain gauges which transmit deformations of the disc to electrical impulses to show which portion of the disc has been deformed by an abnormality within the pipeline. The use of the strain gauges renders the overall structure of the flexible disc complex thus increasing the cost of replacement of a damaged disc. Furthermore, the strain gauges are too sensible for the rough working environment of a damaged pipeline and may therefore produce false readings. The piezo electric strip was found working as a microphone; it recorded all vibrations and one could not differentiate between the vibrations and restrictions. Vibrations of the body and thus of the disc are often encountered in use of the pig. There is no backup system which would indicate, at least roughly, the location of an abnormality in case of failure of the electronic system. The location of the disc at the foremost end of the body is disadvantageous as distorted readings of the deformation of the disc by an abnormality occur at a straight portion of the pipeline and in bends of the pipeline. Also, the disc being fixedly secured to the body, it cannot maintain the same angular clock position as it inevitably changes such position with the rotation of the pig about its longitudinal axis. Such rotation may occur when an abnormality is encountered by the guiding cups. The device therefore is not capable of showing the clock position of an abnormality instantly recorded.

U.S. Pat. No. 4,299,033 (Kiley et al.) presents a calipering tool for oil wells or the like applications. It operates with a plurality of feelers which are in a constant contact with the pipe of a well. The tool is of a complex structure. While it may be useful in calipering wells, it is not suitable for applications where only major deformities of the pipe are required to be discovered to avoid damage to a subsequently used caliper pig. Also, the tool of this reference is raised and lowered by means of a suspension cable which cannot be used in pipeline calipers as they often have to travel long distances of tens of miles.

U.S. Pat. No. 4,443,948 (Reeves) describes a pig for monitoring the internal surface profile of a pipeline. It is provided with a plurality of sensors which are in constant contact with the inner surface of the monitored pipeline. A complex system is required to compare output signals from the sensors with an expected value and reference signal generated when they differ by more than a predetermined amount.

U.S. Pat. No. 4,457,073 (Payne) shows a pipeline pig with sensing means capable of monitoring small changes in the internal configuration of a pipeline. A complex mechanism is used to monitor dragging effect to which an elastomeric cap is submitted upon encountering an obstacle. A major obstacle would most likely destroy or at least damage the mechanism used to record the deformities, as the radial cup is in a constant contact with the interior of the monitored pipeline.

U.S. Pat. No. 4,098,126 (Howard) is provided with a plurality of sensors disposed about the circumference of a resilient holding cup. A spring system forces the sensors against the inside of the pipeline. The device is suitable for monitoring relatively small deformities but would become damaged if a major or sharp deformity is encountered. It is of relatively complex structure with a number of flat spring elements constantly pressing the sensors against the pipeline.

U.S. Pat. No. 4,091,678 (Potter) shows a device for detecting dents or out of round conditions of a buried pipeline. The pig contains two concentric rings. The outer ring is sized to accurately fit the inspected pipeline. It carries on its inner surface electrical contacts adapted to co-operate with contacts provided on the outer surface of the inner ring to close an electric circuit when the outer ring is deformed radially inwardly. The device may be suitable for detecting minor anomalies of the cross-section of the pipeline. Larger deformities would destroy or at least damage the system of coaxial rings.

SUMMARY OF THE INVENTION

It is an object of the present invention to provide an obstacle monitoring or caliper pig which would be of a simple structure permitting relatively low manufacturing costs, monitoring only major obstacles of a predetermined minimum magnitude and providing a simple operation.

In general terms the invention provides a caliper pig for detecting an obstruction in a pipeline, having an elongated body including a front end and a rear end and comprising carrying guide rings at said front and rear ends for supporting the body in a coaxial sliding engagement with the interior of the pipeline and driving the body through the pipeline, the front end first, using the flow of fluid in the pipeline, said body further carrying a coaxial, generally disc-shaped, detector operatively associated with transfer mechanism including a converting member movable relative to the body responsive to a generally axial force to transmit a mechanical impulse developed at the detector to activate and to deactivate an electrical signal producing device housed in said body, wherein (I) said detector has an outer diameter smaller than the inside diameter of the pipeline to define therewith a generally annular void having a predetermined radial clearance;

(ii) said transfer mechanism is operatively disposed between a flexing portion of the detector and said converting member to transmit changes in the form of the deflector to said axial force.

In a particularly preferred embodiment, the detector comprises a resilient disc shaped member mounted on said slider and having a scratch recording layer bonded to a front face of the member turned toward said front end of the pig bonded to a scratch recording layer. The scratch recording layer possesses resiliency sufficient for the layer to follow deformation of the resilient detector and return of the detector to a non-deformed state. Furthermore, the scratch recording layer it has smoothness and softness sufficient for the layer to become and remain scratched when the detector engages an anomaly of a predetermined minimum radial magnitude and when the detector returns to said non-deformed state. Thus, after passage of the pig through the pipeline, the front face of the disc indicates the nature and magnitude of anomaly or anomalies encountered during the passage by way of scratched portions of the recording layer.

In another aspect, the invention provides, for use in a pipeline caliper pig including a body provided with support and drive members for sliding engagement with the interior of the pipeline to drive the body coaxially through the pipeline by the flow of fluid in the pipeline:

an elastomeric, generally disc-shaped detector compatible with said body for securement thereto, said ring comprising;

(a) a first face, an axially opposed second face, and a circular circumferential edge portion having a predetermined diameter smaller than the inside diameter of the pipeline;

(b) said first face having a forward surface possessing:
(I) resiliency sufficient to follow resilient deformations of the ring and to return, with the ring, from a deformed to a non-deformed state;
(ii) smoothness and softness sufficient to become and remain scratched by obstacles in the pipeline as the detector,; secured to said body, advances through the pipeline.

Yet another embodiment of the present invention is generally characterized by a combination, wherein a detector, particularly for use in a caliper pig for detecting an obstruction in a pipeline, is provided. It comprises, in general terms, a resiliently deformable body including a securement portion adapted to be secured to a support, and a flexing portion spaced from the securement portion and adapted to flex relative to said support when subjected to a force in a predetermined direction;

said body comprising
a resiliently deformable first member having a leading face and a trailing face and
a resiliently deformable second member having a leading face and a trailing face;
the trailing face of said first member being turned toward the leading face of said second member; the distance between the trailing face of said first member and the leading face of said second member being at a predetermined minimum when the body is in a relaxed state;

signal generating means disposed in said flexing portion of the body and remote from said securement portion thereof,
said signal generating means comprising:
a first generating element secured to said first member; and a second generating element secured to said second member in an alignment with the first generating element when the body is in a relaxed state;
said first and second generating elements being adapted to co-operate to emit a first signal when the elements are close to each other, and a second signal, distinct from said first signal, when the elements are remote from each other due to a difference between the degree of flexing between the first and second deformable members.

BRIEF DESCRIPTION OF THE DRAWINGS

The invention is described in greater detail with reference to the attached simplified, diagrammatic, not-to-scale drawings, it being understood that while these are presently preferred embodiments, they may be modified to a substantial degree without departing from the gist of the present invention. In the drawings.

DETAILED DESCRIPTION

Figures 1, 2:
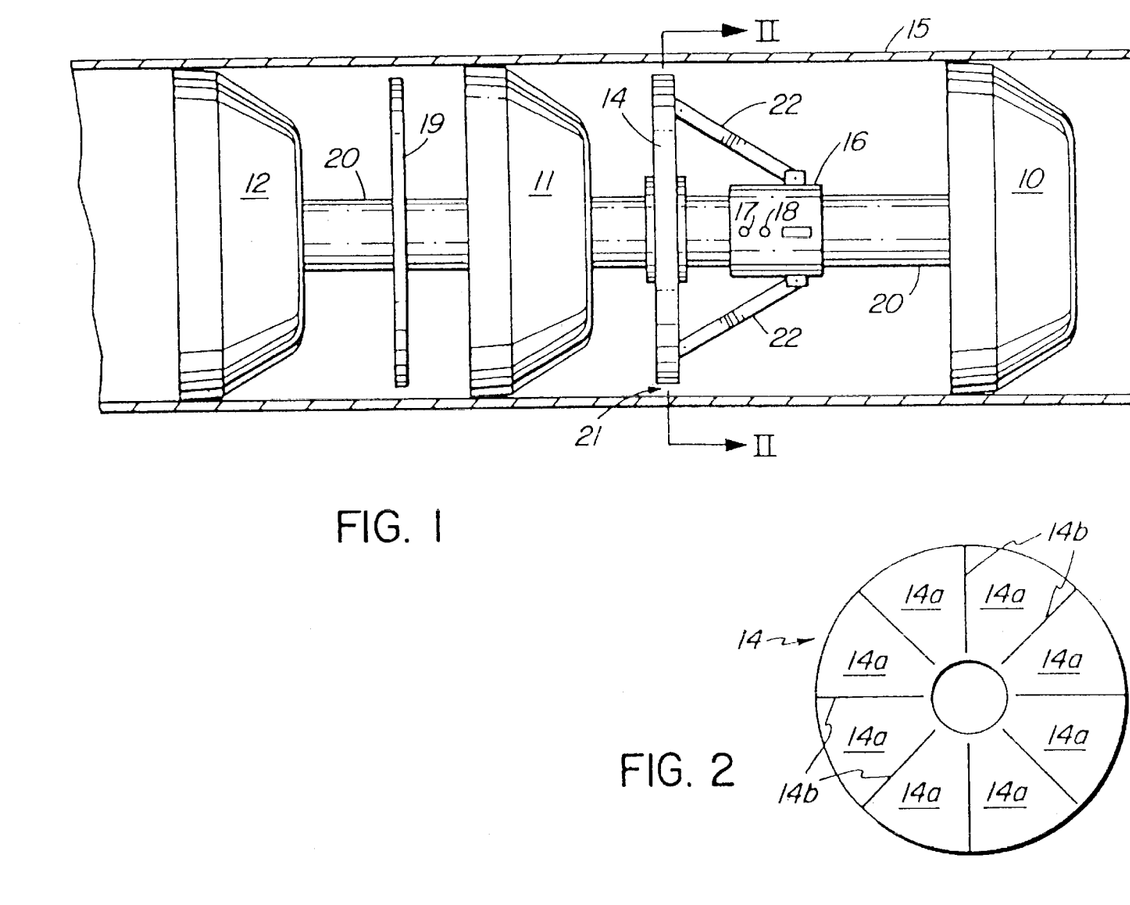
FIG. 1 is a section view of the pig of the present invention shown as it passes through a section of a pipeline.
FIG. 2 is a sectional view taken along the section line 11—11 of FIG. 1.

The first embodiment of the inventive caliper pig is provided with supporting elastomeric rings 10, 11, 12 connected to a centrally disposed cylindric body one after the other and comprised of a front ring 10, an intermediate ring 11 and a rear ring at the back end of the pig.

A segmented, generally disk-shaped resilient member has a number of segments separated from each other along a generally radial line of separation 14b. The member 14 is concentric with the support or guide rings 10–12. It is fixedly secured to the body 20 between the front support ring 10 and the intermediate support or guide ring 11. The resilient member 14 has a smaller outside diameter than the inside diameter of the pipeline 15. The member 14 thus defines an annular void between its outer surface and the inner surface of the pipeline wall. The member 14 may be provided with a scratch recording leading face not shown in FIG. 1 and 2 but described later with reference to FIGS. 3 and 4.

The radial width of the void 21 is predetermined and depends on the operational requirements of particular application. It generally correspond to the maximum tolerable size, usually specified by the operator of the pipeline, of restrictions at the inner surface of the pipeline 15. As a rule, the width of the void 21 presents about 10% of the inner diameter of the pipeline. A number of links 22 are pivotally connected with their rear ends to front faces of the segments 14a of the resilient member 14 at its flexing portion which is radially beyond the flanges or the like members securing the disc 14 to the body 20. The front ends of the same links 22 are pivotally connected to a slider 16 which is slidable in axial direction on the body 20. When the resilient member is relaxed (as shown in FIG. 1), it holds the slider 16 at a predetermined resting position relative to the body 20 such that the first and second switches 17, 18 are inactive.

The pig is propelled through the pipeline by a pressure differential at the front and rear ends of the pig, driving the pig from the left to the right of FIG. 1. If an obstacle is encountered at the wall of the pipeline 15, which is radially in excess of the width of the void 21, the respective segment 14a of the resilient member 14 is deflected by a force which is proportional to the size of the obstacle. Since the pig continues its movement, the segment 14a of the resilient member 14 pulls the slider 16, via the respective link 22, to the left of FIG. 1. The slider 16 is displaced a predetermined distance which is sufficient to activate the mechanism (not shown in detail) of the first switch 17. As a result, emission of an appropriate signal takes place indicating that a relatively small obstacle, for instance, a dent in the wall of pipeline 15 has been encountered. Eventually,;the resilient member runs over the obstacle and returns back to the relaxed state thus returning the slider 16 back to the resting position where both switches 17, 18 are again inactive.

If the obstacle encountered is more substantial, e.g. a partly closed valve, the resilient member 14 is displaced along the body 20 to a greater axial distance, activating the second switch 18 to provide a signal of the more substantial anomaly having been encountered.

A deformable barrier ring 19 made, for instance, of a malleable, relatively thin sheet metal, has the same diameter as the resilient member 14. It is mounted at the rear end of the pig. Its purpose is to double check the function of the switches 17, 18. If any of the switches malfunctions and fails to indicate an anomaly, then such anomaly inevitably deforms the ring 19 thus providing information that the switch triggering mechanism malfunctioned. If no signal of an obstacle is received and after the completed run of the pig C the check ring 19 is not deformed, then indeed no obstacle was encountered in the inspected section.

Whenever the pig detects a restriction, time may, be recorded and saved for analysis at the end of the run. Information recorded may be fed to a computer!that will correlate the time the restrictions were encountered with other tracking information and pipeline geographic position. The positioning will only provide the operator with an approximation of the restriction location. This, however, is a sufficient information as the state of any given pipeline section is normally monitored and anomalies recorded by the pipeline owner or user.

As the pig is designed to only detect large restrictions that are associated with partially closed valves or some other fitting problems, or exceed industry guidelines, the limited accuracy will still provide the operator with sufficient information to determine if there are any excessive restrictions and, if a restriction has been identified, to eliminate it before running other, more sensitive caliper pigs, and ensure that the pipeline is maintained within the industry guidelines.

Figure 3:
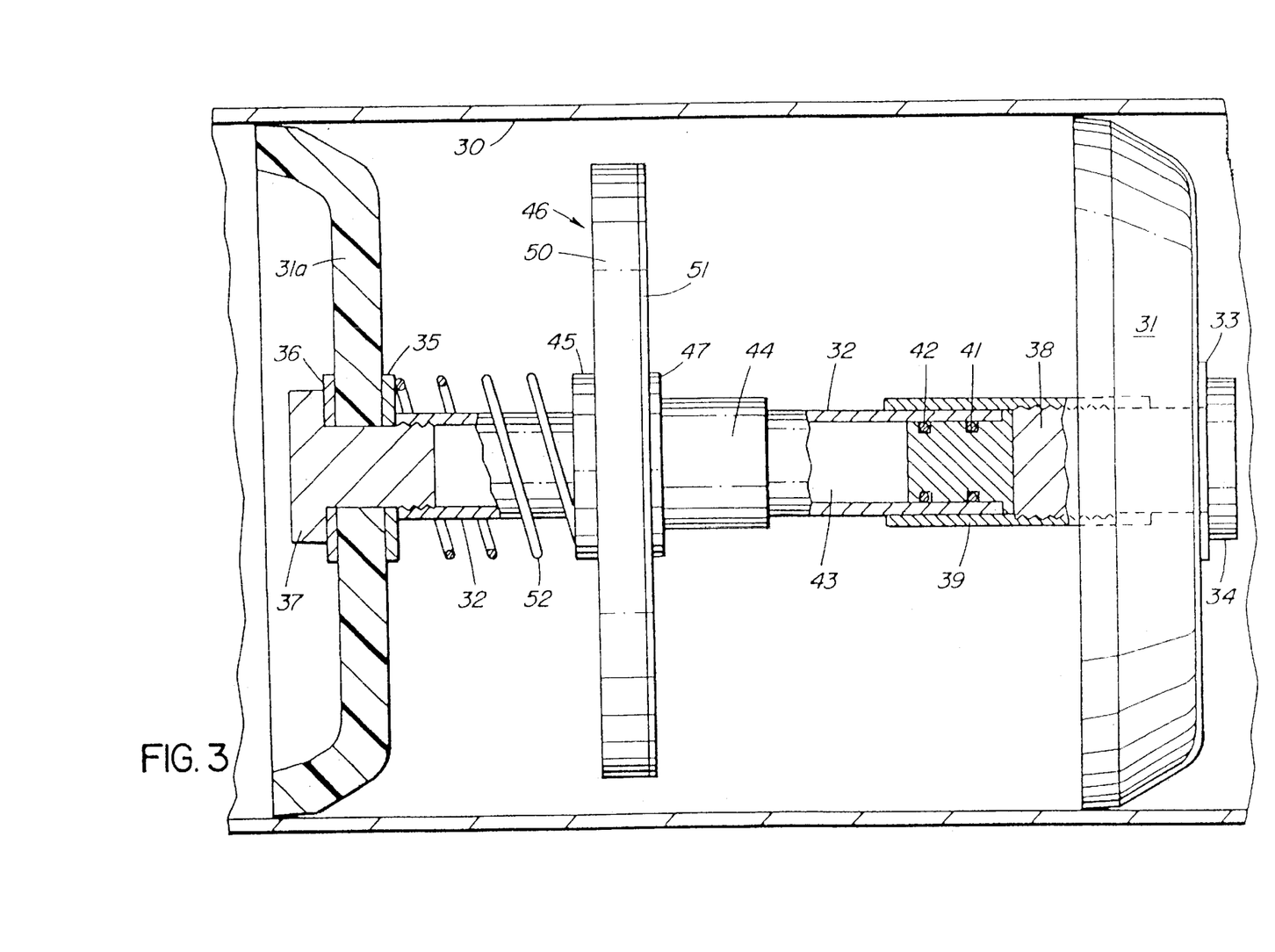
FIG. 3 is a view similar to that of FIG. 1 but showing another, preferred, embodiment of the pig of the present invention.

Turning now to the embodiment of FIG. 3, an improved and particularly preferred embodiment of the pig is shown in an operative position, received in a pipeline 30. The pig comprises two resilient guide rings 31, 31a, one at the front, the other at the rear of the pig body 32 which has a generally tubular configuration. The front guide ring 31 is secured to the body 32 by a holder plate 33 pressed against the ring 31 by an end cap 34. The rear guide ring 31a is secured to the body 32 by holder plates 35, 36 pressed against the rear end of the body 32 by an end cap 37. As is well known, at least the front guide ring 31 engages the pipeline 30 in a sealing fashion to provide a pressure differential caused by the flow of a fluid through the pipeline 30, driving the pig from the left to the right of FIG. 3.

The front end cap 34 is provided with a threaded inner portion 38 which is engaged in a tubular sleeve 39 fixedly secured, for instance by welding or adhesively, to the body 32 near the front end thereof. The inner portion 38 of the end cap abuts against a plug 40 provided with a front O-ring 41 and a rear O-ring 42, to seal the hollow tubular interior 43. The tubular interior 43 houses a switch mechanism or the like electro-mechanical device.

The slider 44 of the embodiment shown has a cylindric surface integrally formed with a radially outwardly projecting rear flange or shoulder portion 45. A resilient disc shaped detector 46 abuts with its back end against the flange portion 45. The detector 46 is retained generally in abutment with the flange portion 45 on the slider 44 by a retainer clip 47 received in an appropriate groove machined in the surface of the slider 44. As in the first embodiment described, the portion of the disc 46 radially outwardly of the shoulder portion 45 is generally referred to as a flexing portion of the detector. The slider comprises a known switch mechanism. Such switch mechanism would typically have a magnet or magnets on the inside of the slider 44 and detector switch or switches secured to the body 32. Many obvious modifications of the electric signal producing arrangement can be used without departing from the invention. Therefore, the sleeves 44 or 16 are to be considered merely as preferred embodiment of what is generally referred to as a transfer mechanism including a converting member (e.g. the sleeve) movable relative to the body 32 or 20 responsive to a generally axial force to transmit a mechanical impulse developed at the detector 46 to activate or deactivate an electrical signal producing device.

The outer diameter (OD) of the detector 46 is about 20% smaller than the inside diameter (ID) of the pipeline 30. For instance, if the ID of the pipeline 30 is 10", then the OD of the detector 46 is about 8". The detector 46 is composed of a resilient disc, in the embodiment shown a polyurethane disc 50. The front face of the disc 50 is provided with a scratch recording layer, in the embodiment shown, a lead layer 51 which is bonded to the disc 50 so that the two form a generally integrally formed structure. According to the present invention, the thickness of the lead layer 51 is selected such that it has flexibility sufficient to follow deformation of the disc 50 when the detector 46 encounters an anomaly in the pipeline. At the same time, the flexibility of the layer 511 provides that once the anomaly is cleared, the layer 51 follows the disc 50 bouncing back to the original, relaxed position. The lead layer 51 is preferred in the present invention as it can be easily scratched by obstacles encountered during the passage of the pig through the pipeline 30. By the same token, the flexibility of layer 51, which is mainly due to the selected thickness thereof, permits the return back to the relaxed position while the scratches on the surface of the layer 51 remain recorded ready to be interpreted upon passage of the pig through the examined section of the pipeline 30.

The desired thickness of the layer 51 is easy to determine, for instance by a simple trial-and-error method. As an example, it has been established that in, case of the above example of a diameter of the detector being about 8", the preferred thickness of the polyurethane disc 50 is about ¾" and the thickness of the lead layer 51 meeting the above resiliency conditions is about ⅟₁₆". These figures, of course, are optional.

While, at the present time, lead has provided best results in resiliency and retaining the scratch marks on the face of the detector 46, those skilled in the art will appreciate that other materials can be used to substitute the lead layer 51. A vast number of different materials including paints applied to the leading face of the disc 50 would also provide satisfactory results both from the standpoint of flexibility and retaining the scratches made during the passage through a the pipeline 30.

Turning now back to FIG. 3, the rear end portion of the body 32 carries a compression spring 52. The front end of the spring 52 presses against the rear surface of the flange 45, while the rear end of the spring 52 engages the surface of the holder plate 35. The rear guide ring 31a may be provided with passages (not shown) for the fluid to flow through the pipeline 30 and generate the required propelling force at the front ring 31.

The spring 52 holds the slider 44 in a relaxed position shown in FIG. 3. When an obstacle is encountered, the detector 46 deflects and at the same time exerts axial force upon the slider 44 displacing it to the left of FIG. 3, thus triggering the not shown switch mechanism provided within the cavity 43.

Figure 4:
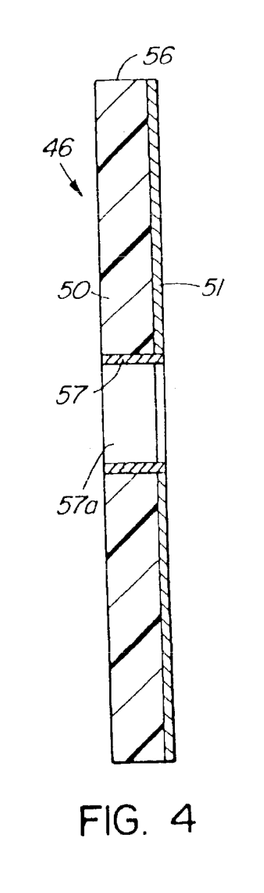
FIG. 4 is a sectional view of a detector as a replaceable part of the pig shown in FIG. 3.

It is advantageous to provide the detector 46 as an easily exchangeable replacement part for the pig. One embodiment of such spare or replacement detector 46 is shown in FIG. 4. The disc-shaped detector 46 has an outer circumference 56 having a predetermined diameter, for instance 8 ", as discussed above. The inner central opening 57a in a sleeve 57 bonded to the disc 50 is compatible with the outer surface of the slider 44 and, in the exemplary size discussed above is about 2".

Figure 5:
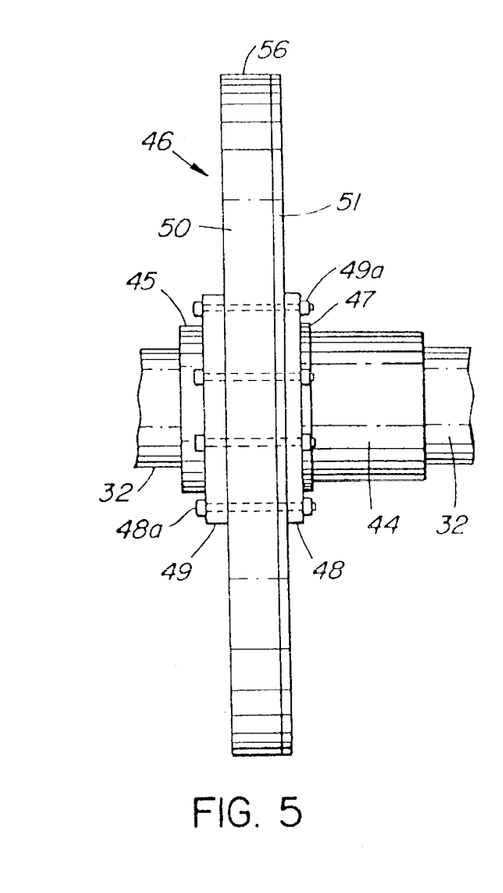
FIG. 5 is a partial section view similar to FIG. 3 but showing only a detail of an alternative structure of the detector attachment to the body of the caliper pig.
Figure 6:
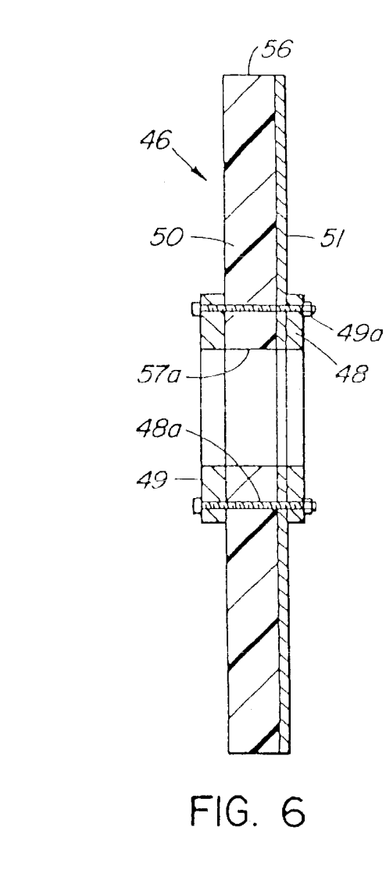
FIG. 6 is a section view similar to FIG. 4 but showing the alternative structure of the detector used in the embodiment of FIG. 5.

An alternative embodiment of the detector 46 is shown in FIG. 6. Here the detector is again a laminate of a resilient disc 50 with a scratch recording lead face 51. The laminate is held between opposed flanges 48, 49 by a series of bolts and nuts 48a, 49a. FIG. 5 shows that the assembly of FIG. 6 is again retained on the body 32 between the shoulder portion 45 and the retainer clip 47.

The detector laminate 50, 51 shown was produced by first preparing a lead plate having the above thickness of about ⅟₁₆" and major and minor diameters of about 8" and 2", respectively. The surface facing the resilient disc 50 was cleaned and roughened. The lead plate was then placed in a compatible form and the desired volume of polyurethane poured, into the form over the lead plate. With the polyurethane cured, sufficient bond was obtained between the polyurethane disc and the lead layer.

Embodiments of the present invention have also been produced, where the detector was simply bonded to the slider 44 thus eliminating the need for the shoulder 45—clip 47 arrangement. A vast number of other obvious, notoriously known methods of mechanical securement of the detector to the body exist and can be used to secure the detector 46 in operative position.

While the embodiments described above have worked satisfactorily, it was realized that a further improvement may be provided which would not only detect an anomaly but also its general position relative to the periphery of the pipeline.

Figure 7:
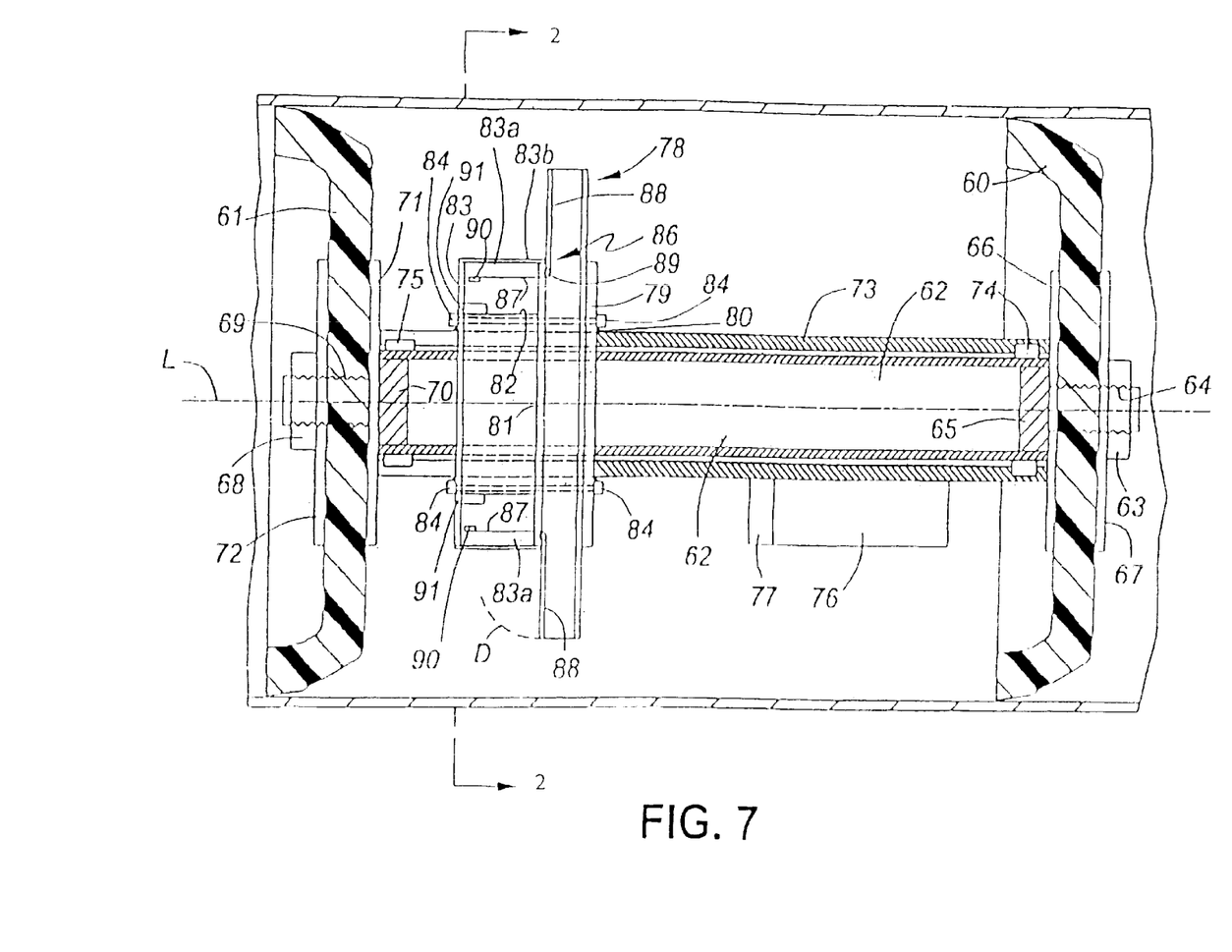
FIG. 7 is a section view of yet another embodiment of the pig of the present invention.
Figure 8:
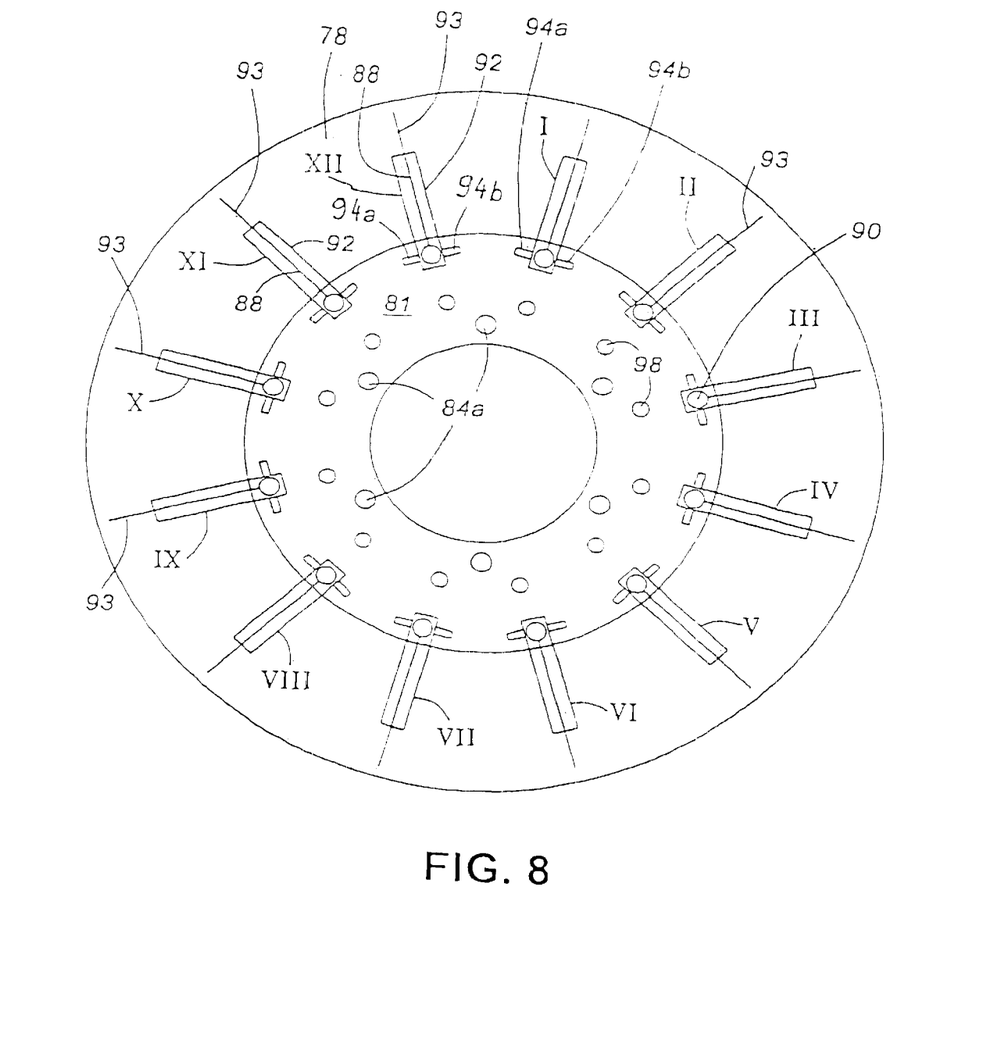
FIG. 8 is a view taken in the direction of arrows 8—8 of FIG. 7.

FIGS. 7 and 8 show such additional improvement

As is the embodiment of FIG. 3, the improved pig comprises a pair of front and rear resilient guide rings 60, 61. The front ring 60 is secured to a tubular body 62 having an axis L of elongation, by way of a front end cap 63 threadably engaging a threaded portion 64 projecting from a plug 65 which is fixedly secured, by welding or adhesively, to the inside of the tubular body 62 at the front end thereof. The front end cap 63 holds the front ring 60 between an inner front flange 66 and an outer front flange 67. The inner front flange 66 is fixedly secured to the front end of the tubular body 62. Thus, the outer front flange 67, the front ring 60 and the cap 63 are all fixedly secured relative to the tubular body 62.

Similarly, the ring 61 is secured to the tubular body 62 by way of a rear end cap 68 threadably engaging a threaded portion 69 projecting from a rear plug 70 which is fixedly secured, by welding or adhesively, to the inside of the tubular body 62 at the rear end thereof. The rear end cap 68 holds the rear ring 61 between an inner rear flange 71 and an outer rear flange 72. The inner rear flange 71 is fixedly secured to the rear end of the tubular body 62. The outer rear flange 72, the rear ring 61 and the cap 68 are thus all fixedly secured relative to the tubular body 62.

A tubular mandrel 73 is mounted for a free rotation on the body 62. The mandrel 73 rotates on bushings 74, 75. The bushings also prevent axial displacement of the mandrel 73 relative to the body 62. The mandrel 73 is also freely rotatable relative to the inner front flange 66 and the inner rear flange 71 and their associated assemblies of the front and rear rings 60, 61.

Welded to the lower exterior of the mandrel 73 is a tubular member 76 with screwed sealed cap 77. The tubular member 76 has two functions: it houses a recording system and at the same time provides ballast which maintains the freely rotatable mandrel 73 in a position shown in FIG. 7, regardless of the actual instant position of the discs 60, 61 and the tubular body 62 fixedly secured to them. The weight of the tubular member 76 will thus maintain the member at a downward, essentially 6o'clock position when viewed axially relative to the mandrel 73. As a result, all portions of the face of a disk-shaped detector 78 are maintained at all times at a generally constant position with respect to a fictitious vertical reference plane P. See FIG. 8.

The resilient disc-shaped detector 78 abuts against a plate or shoulder portion 79 which is fixedly secured relative to the mandrel 73 by a weld 80 to the mandrel 73. The rear surface of the detector 78 abuts a circular plate 81 which, in turn, abuts an annular spacer member 82. At the opposite end of the spacer member 82, a plate 83 sealingly encloses the interior of an annular cylindric chamber 83a disposed between the radially outer surface of the spacer member 82 and an outer annular wall 83b. The entire chamber 83a, the spacer member 82, the rear annular plate 81, the plate detector 78 and the front annular plate 79 welded to the mandrel 73 are fixedly secured to each other and thus to the mandrel 73 by a series of bolts 84. The bolts 84 are disposed at a uniform circumferential spacing about the above members and pass through bolt passages 84a (FIG. 8).

The portion of the disc 78 radially outwardly of the plates 79, 81 is generally referred to as a flexing portion of the detector 78.

Figure 10:
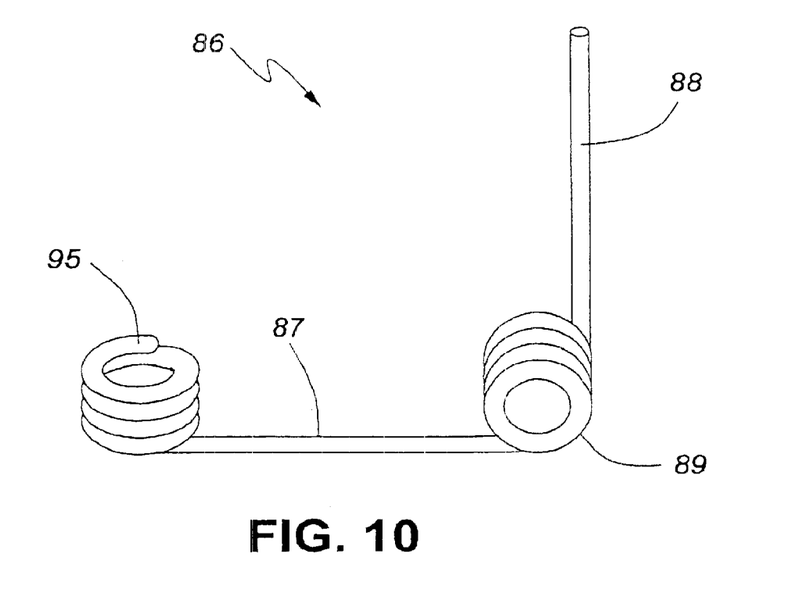
FIG. 10 is a view of an exemplary embodiment of the structure of a sensor spring of the present invention.

L-shaped springs 86 made of a commercially available spring steel of about 1/16" have each an axial arm 87 and a radial arm 88 adjoining each other at a coiled central section 89 at an angle, in the embodiment shown, a right angle. The central section 89 has about 3–4 coils. The axial arm 88 is provided at its free end with a coiled support section 95. Both arms are resiliently flexible.

Each spring 86 is pivotable, at the central section 89, relative to the plate 81 about an associated pivot pin 94 passing through the central section 89 and projecting to both sides thereof. Each pivot pin 94 is held in place by a short, tangential groove 96 (FIG. 9) machined in the face of the annular rear plate 81 turned towards the disc detector 78. The opposed ends 94a, 94b of each pin are pressed against the resilient surface of the detector 78 and are thus held in place. In other words, each spring can swing within a respective plane defined by the L-shape, i.e. a plane parallel with (in the embodiment shown, generally coincident with) the axis-L of the mandrel 73. The springs 86 are evenly circumferentially spaced with respect to the disc 78 as best seen in FIG. 8. It will be appreciated that the coincident arrangement with axis-L is not absolutely necessary even though it is preferred.

Each axial arm 87 is provided at its free end with a permanent magnet 90 held in place by the respective support section 95. Assigned to each magnet 90 is a magnetic position switch 91. In the embodiment of FIGS. 7 and 8, a magnetic position switch commercially available under the trade name Hamlin has been proposed. As is known, the magnetic, position switch 91 is located in a non-magnetic envelope fixedly secured to the surface of the annular spacer 82. The non-magnetic envelope can be made from a number of suitable materials for instance from stainless steel, aluminum or a thermoplastic material. In many applications, the magnetic sensors are grouped depending on the accuracy of indication of the pipeline anomaly required.

Figure 9:
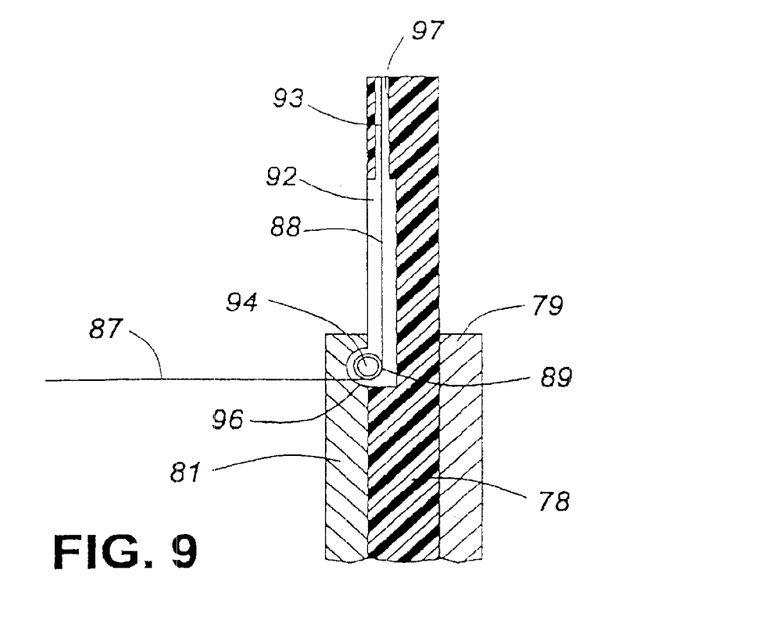
FIG. 9 is a view of mutual arrangement of a sensor spring relative to the detector surface.

FIGS. 8 and 9 show that the radial arms 88 of springs 86 are evenly spaced around the detector 78. The radial arms 88 are each located in an associated groove 92 milled into the face of the disc 78. The grooves 92 terminate short of the edge of the disc 78. The remaining portion from the radially outer end of grove 92 to the edge on disc 78 contains a radial hole 97 (FIG. 9). Free end portions 93 of the radial arms 88 of the springs 86 are each inserted into a respective hole 97. The holes co-operate with the pivots 94 to keep the radial arms 88 of springs 86 secured to and generally flush with the surface of the disk 78 at all times.

FIG. 8 further shows that, in the embodiment described, the grooves 92 or the free end portions 93 divide the entire circumference of the disc 78 into twelve segments. They have each a predetermined arc and length of its chord. In the embodiment of FIG. 8, the arc and thus the length of the chord is the same in each segment.

While this arrangement is preferred in most applications, it can be modified to two or more different arcs of the segments.

There are twelve switches disposed about the periphery at slightly counter-clockwise offset locations in which the XII o'clock point is offset counterclockwise by 15° so that the uppermost point of the circle is between the XII o'clock and I o'clock position.

If it is desired to find out only whether a particular obstacle is in the upper or lower part of the pipeline, then only two groups of the signal developing switches are required of the usual twelve switches. In case of twelve switches disposed about the periphery of plate 81 and offset as described, a group of switches at the offset X, XI, XII, I, II and III o'clock positions would serve in determining an anomaly in the upper part of the pipeline, while switches in the IV, V, VI, VII, VIII and IX o'clock position would transmit a signal corresponding to the anomaly in the lower part of the pipeline. If a more detailed indication is required, more groups, each having a fewer number of switches, would be grouped or each switch would indicate anomaly at its position about the circumference of the pipeline. Customers normally specify their requirements concerning the accuracy required.

In operation, the pig is propelled through an associated pipeline in a fashion as already described. When an obstacle is encountered, a segment of the disc 78 becomes deflected in the direction D shown at the bottom of FIG. 7. Assuming that the detected obstruction is at the lower part of the pipeline, the radial arms 88 follow the local deflection of the disc raising the axial arms 87 of the lower springs 86 at the offset 6 and 7 o'clock positions to bring the associated magnets 90 into contact with the magnetic sensor switches 91. The sensing switches 91 then transmit electric signal to a conventional electronic recording device located within the tubular member 76. This is effected by leads, not shown; passing through passages 98 in the disks 81, 78 and 79.

The springs 86, holding each a magnet and the annular spacer 82 holding a plurality of magnetic switches 91 can also be generally referred to as transmission devices comprised of a first transmission member and a second transmission member. In the embodiment described the spring 86 functions as the first transmission member. The spacer 82 of the embodiment described is an example of a second transmission member. It will be understood that the particular embodiment described is not the only one readily conceivable and that the functions can be easily reversed. The designation of the transmission members as first and second is therefore to be understood as a general definition of the two and does not necessarily refer to which of the members carries the magnet 90 and which carries the switch 91. For the same reason, the term "first support portion" of the embodiment shown is designated as the one carrying permanent magnet while the "second support portion" of the second transmission member carries the switch, it being understood that this function can readily be reversed. Therefore the above general terms must be interpreted in their general meaning and not to be limited to their meaning with respect to the embodiment disclosed. The sensing switches, their leads (not shown) passing through one or more passages 98 to the recording device in the tubular member 76 and the recording device itself do not form, a part of the present invention and are therefore not described in detail. They are comprised of commercially available components.

Figure 11:
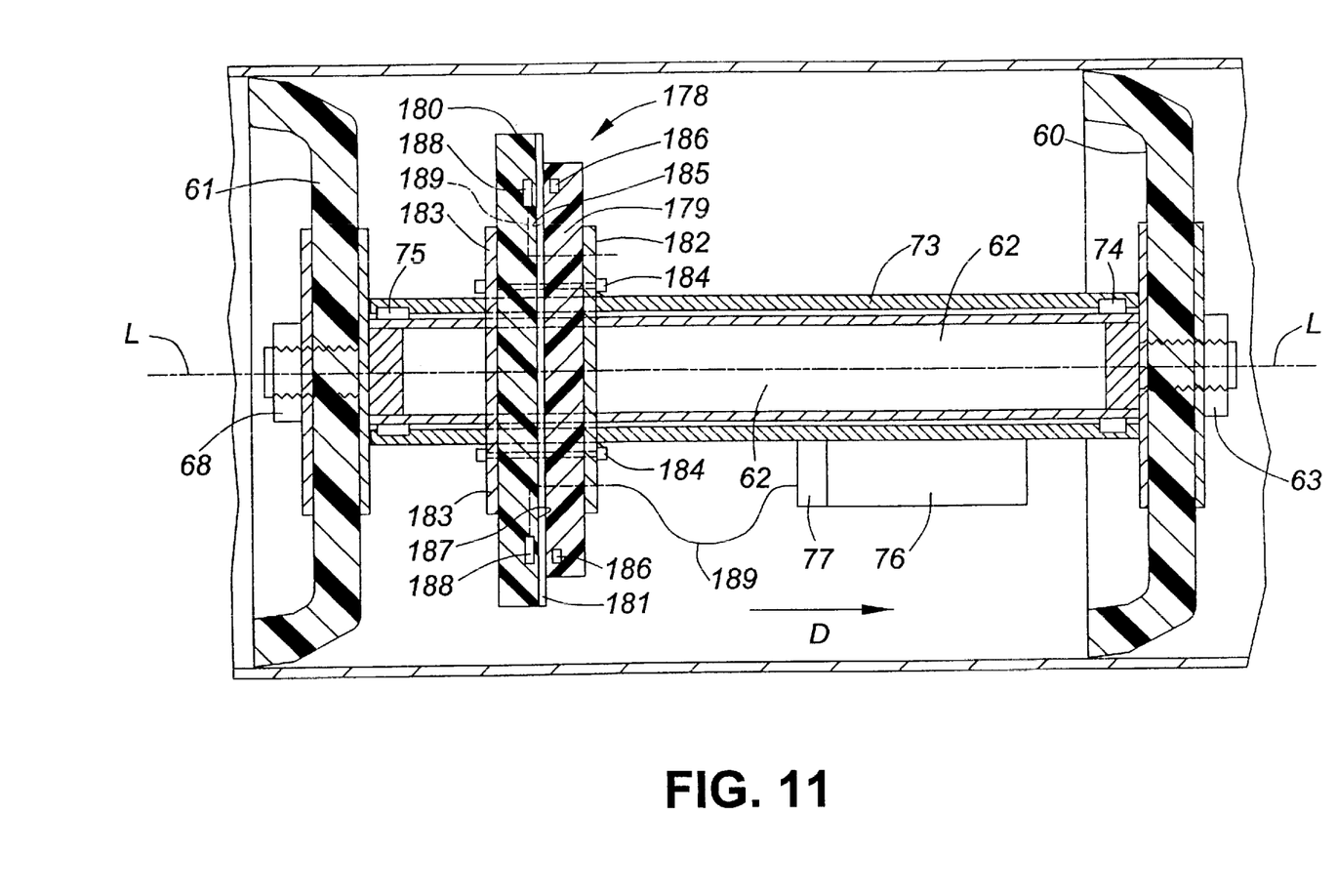
FIG. 11 is a diagrammatic, out-of-scale side view of yet another embodiment of the present invention.

FIG. 11 shows an improvement of the embodiment of FIG. 7. The improved embodiment presents a substantially simpler and thus less expensive structure and an improved reliability in operation.

The front and rear carrying guide rings 60, 61, the mandrel 73 rotatable on the elongated body or carrier 62, and the tubular member 76 secured to the lower portion of the mandrel 73, are identical in structure and function with the embodiment of FIG. 7 and are therefore referred to with the same reference numbers.

In FIG. 11, the resilient, disc-shaped detector body 178 has a different, substantially simplified structure. The detector is provided with two coaxially arranged, resiliently flexible discs 179, 180, each having a resiliently flexible outer portion and, preferably, with an intermediate scratch indicating layer 181. The disc 179 presents an embodiment of what is referred to as "a first member," the disc 180 as "a second member" or vice-versa. In the embodiment shown the layer 181 is a thin sheet of plastic material cut into a disc-like configuration having the same diameter as the rear or trailing disc 180, as viewed from the standpoint of direction D in which the pig advances through the pipeline. The diameter of the trailing disc 180 is, preferably, but not necessarily, larger than that of the leading disc 179. The layer 181 is sandwiched between the leading disc 179 and the trailing disc 180.

The assembly of discs 179, 180, 181 is fixedly secured to the mandrel 73 by a pair of opposed flanges 182, 183 presenting and embodiment of what! can generally be referred to as "a support of a securement portion." The flanges are welded or otherwise fixedly secured to the mandrel 73, generally as in the previously described embodiment. The bolts 184, disposed at a uniform circumferential spacing, secure the discs much in the same fashion as in the previously described embodiment.

Thus, the assembly of discs 179, 180 and 181 is freely rotatable about the axis L by virtue of its securement to the freely rotatable mandrel 73. Viewed from the standpoint of direction D, each disc 179, 180, has a leading face and a trailing face.

Embedded in the leading disc 179 near its trailing face 185 is a series of equidistantly circumferentially spaced apart permanent magnets 186. Similarly, there are embedded in the trailing disc 180 near its leading face 187, equidistantly circumferentially spaced apart magnetic switches or sensors 188 which are aligned each with one of the magnets 186. Each pair of the magnet 186 and sensor 188 presents an embodiment of an electronic signal generating means, wherein the magnet and the sensor forms a first and a second electronic signal generating element or vice-versa.

The switches or sensors 188 co-operate with the, magnets 186 in a fashion similar to that of the previously described embodiment of FIG. 7. That is to say, when a respective magnet 186 is at a close proximity to its associated sensor 188, the sensor 188 is activated to emit a first signal communicated by the respective lead 189 to a conventional recording device located in the tubular member 76. The close proximity between the magnets and the sensors 188 exists when the two discs 179, 180 are in a relaxed state shown in FIG. 11.

Figure 12:
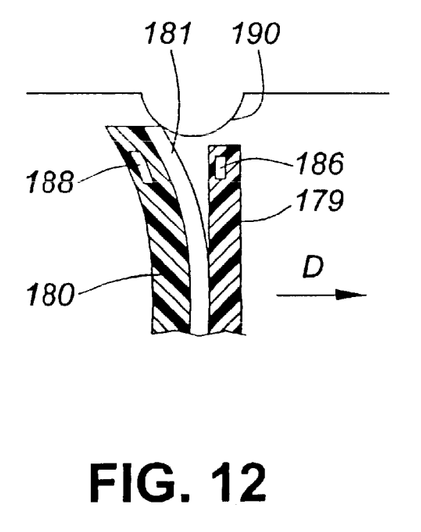
FIG. 12 is a detail of the embodiment of FIG. 11 showing the sensor in an operative position when encountering a relatively small irregularity of the pipeline.
Figure 13:
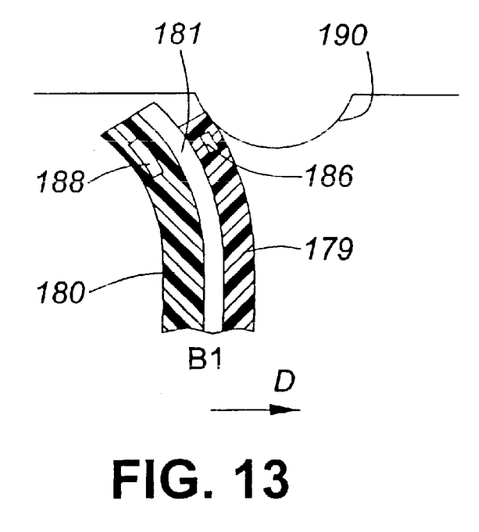
FIG. 13 is a view similar to that of FIG. 13 showing the sensor at the initial stage of encountering a larger irregularity than that shown in FIG. 12.
Figure 14:
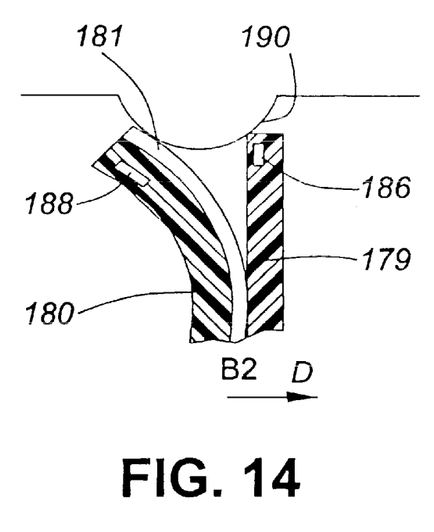
FIG. 14 is a view similar to that of FIG. 13 at the stage following the initial contact of FIG. 13, with the sensor in an actuated state.

As shown in FIGS. 12–14, when an obstruction is encountered, as the body 62 advances in the direction D, the close proximity of one or more of the sensors 188 with their associated magnets 186 is disturbed causing a change in the electronic signal. The sensors 188, the magnets 186 and the recording device located in the tubular member 76 are all commercially available items. Their particular design does not form a part of the present invention and therefore is not described in detail.

Turning now to FIG. 12, a situation is depicted where a relatively small obstruction 190 has been encountered by the pig traveling in the direction D. At a position shown, the obstruction 190 protrudes into the inside of the pipeline at a radius (measured from the axis L) which is larger than the radius of the leading disc 179 but smaller than that of the trailing disc 180. Therefore, the leading disc 179 passes by the obstruction 190 maintaining its relaxed state. As a flexing part of the trailing disc 180 encounters the obstruction 190, it is subjected to an axial force directed opposite to the direction D. The opposite force is also referred to as "a force in a predetermined axial direction." The flexing part of the trailing disc 180 flexes rearwards as shown in the drawing. This flexing causes disturbance of the relationship between the respective pair comprised of the magnet 186 and the associate sensor 188. As a result, a second electronic signal, different from the first signal, is communicated to the recording device in tube 76. The position of the disturbed arrangement is also recorded since the ballast, formed by or secured to the tube 76 maintains a position of the tube 76, vertically aligned with the axis L.

In FIG. 13 a larger abnormality 190 has been encountered which reaches into the pipeline at a radius smaller than either of the two discs 179, 180. At the outset, both discs flex rearwards as shown. The magnet or magnets 186 remain at a close spacing from the associated sensor 188. However, as shown in FIG. 14, as soon as the leading disc 179 passes the obstruction, it springs forwards to a relaxed state while the trailing disc 180 remains flexed thus disturbing the close arrangement between the magnet 186 and the associated sensor 188 again resulting in a change of the electronic signal.

The presence and radial position of the abnormality 190 can be double checked upon eventual examination of the scratches caused by the abnormality 190 on the leading surface of the scratch disc 181 which, preferably, is a thin, separate disc from plastic polyethylene. In an exemplary embodiment suitable for a pipeline having a 20 " ID, the outside diameter of the large, (in the embodiment shown, trailing) disc 180 would be about 19½" and that of the small diameter, leading disc 179 would be about 19". The thickness of each disc is about ¾ ". The discs 179, 180 are preferably integrally formed but an embodiment wherein they would be subdivided into a plurality of independently flexing segments with aligned pairs of signal generating devices may also be feasible under certain circumstances.

Those skilled in the art will readily appreciate that many equivalent arrangements to those described may exist. For instance, the disposition of the magnets 186 and the sensors 188 can be reversed and does not even have to be uniform but may alternate within one of the two discs with an appropriate modification of the other disc. While it is preferred that the trailing disc 180 have a diameter larger than that of the leading disc, the arrangement is optional. The two discs may also have generally the same diameter. In an extreme, not recommended, the disc 179 could even have a larger diameter than of the trailing disc 180.

The flexing portion described is a disc. However, an equivalent arrangement could be made in an embodiment where the disc would be replaced by a plate or a strip where the checkup of a generally planar surface is required. Even in a pipeline monitoring arrangement, a system of several independent strips, each having a leading flexing portion and a trailing flexing portion, could be used, while, obviously, the disc-shaped arrangement is preferred for its simplicity.

Those skilled in the art are aware that other equivalent systems producing electronic signal suitable for use in the mechanism of the present invention are commercially available.

Accordingly, many different modifications of the overall arrangement of the monitoring pig of the kind disclosed can be made which may depart from the embodiments described without departing from the gist of the present invention.

What is claimed is:

1. A caliper pig for detecting an obstruction in a pipeline, including an elongated carrier having an axis of elongation, including a front end and a rear end and having carrying guide rings at said front and rear ends for supporting the carrier in a coaxial sliding engagement with the interior of the pipeline and for driving the carrier through the pipeline, the front end first, using the flow of fluid in the pipeline, said carrier supporting a coaxial, generally disc-shaped resiliently deformable detector, said detector comprising:
   (a) a resiliently deformable, disc shaped detector body including a radially inner securement portion secured to the carrier, and an outer flexing portion spaced from the securement portion and adapted to flex relative to said carrier when subjected to a force in a predetermined axial direction, said disc shaped body including
      (I) a resiliently deformable first member having a leading face and a trailing face; and
      (ii) a resiliently deformable second member having a leading face and a trailing face;
      (iii) the trailing face of one of said first and second members being turned toward the leading face of the other one of said first and second members;
   (b) the distance between the faces turned towards each other being at a predetermined minimum when the body is in a relaxed state;
   (c) electronic signal generating means disposed in said flexing portion of the body and remote from said securement portion thereof, said signal generating means comprising:
      (I) a first generating element secured to said first member and
      (ii) a second generating element secured to said second member in an alignment with the first generating element when the body is in a relaxed state;
   (d) said first and second generating elements being adapted to co-operate to emit a first signal when the elements are close to each other, and a second signal, distinct from said first signal, when the elements are remote from each other due to a difference between the degree of flexing between the first and second deformable members; and
   (e) transmission means for transmitting the first and second signal to a recording device.

2. The caliper pig of claim 1 wherein the detector is fixedly secured to a mandrel, said mandrel being mounted on said carrier for rotation about said axis of elongation and being axially fixed relative to the carrier.

3. The caliper pig of claim 2 further comprising a ballast being a chamber fixedly secured to the mandrel at a lowermost outer portion thereof.

4. The caliper pig of claim 3 wherein the recording device is disposed in said chamber fixedly secured to the mandrel.

5. The caliper pig of claim 1, wherein the first generating element is a permanent magnet and the second generating means is a magnetic sensor, said transmission means connecting each magnetic sensor to said recording device.

6. The caliper of claim 1, wherein said first member and said second member are each an integrally formed disc-like flexible members.

7. A detector, for use in a caliper pig for detecting an obstruction in a pipeline, comprising:
   a resiliently deformable body including a securement portion adapted to be secured to a support, and a flexing portion spaced from the securement portion and adapted to flex relative to said support when subjected to a force in a predetermined direction;
   said body comprising
      a resiliently deformable first member having a leading face and a trailing face and
      a resiliently deformable second member having a leading face and a trailing face;
   the trailing face of said first member being turned toward the leading face of said second member;
   the distance between the trailing face of said first member and the leading face of said second member being at a predetermined minimum when the body is in a relaxed state;
   signal generating means disposed in said flexing portion of the body and remote from said securement portion thereof;
   said signal generating means comprising:
      a first generating element secured to said first member and a second generating element secured to said second member in an alignment with the first generating element when the body is in a relaxed state;
   said first and second generating elements being adapted to co-operate to emit a first signal when the elements are close to each other, and a second signal, distinct from said first signal, when the elements are remote from each other due to a difference between the degree of flexing of the flexing portions of the first and second deformable members.

8. The detector of claim 7 wherein said body, said first member and said second member are generally flat disc shaped,
   said securement portion of the body is that portion which is near the center of the body,
   said flexing portion is that portion which is remote from said center of the body and close to the circumference of the body,
   said body comprises a plurality of said signal generating means disposed at a generally equidistant spacing circumferentially of the body.

9. The detector of claim 8, wherein the first member and said second member are each a disc made from a rubber-like polyurethane material;
   the first generating element is embedded in the first member near the trailing face thereof; and the second generating element is embedded in the second member, near the leading face thereof.

10. The detector of claim 9, wherein said first generating element is one of a permanent magnet and a magnetic switch adapted to be connected to a recording device, and said second generating element is the other one of the permanent magnet and the magnetic switch adapted to be connected to a recording device.

11. The detector of claim 8, wherein said second member is disposed behind the first member in the sense of said predetermined direction, and wherein the diameter of said second member is larger than that of the first member.

12. The detector of claim 7 further including a scratch layer disposed between the first member and the second member and is formed by a disc-like plastic sheet.

* * * * *